(12) United States Patent
Kim et al.

(10) Patent No.: US 12,533,960 B2
(45) Date of Patent: Jan. 27, 2026

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Taeheon Kim, Gyeonggi-do (KR); Jaekwang Seol, Gyeonggi-do (KR); Donghoon Kang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 196 days.

(21) Appl. No.: 18/238,161

(22) Filed: Aug. 25, 2023

(65) Prior Publication Data
US 2024/0190255 A1    Jun. 13, 2024

(30) Foreign Application Priority Data
Dec. 7, 2022  (KR) .......................... 10-2022-0169914

(51) Int. Cl.
*B60L 7/26* (2006.01)
*B60T 8/32* (2006.01)
*B60T 13/58* (2006.01)

(52) U.S. Cl.
CPC .............. *B60L 7/26* (2013.01); *B60T 8/3205* (2013.01); *B60T 13/586* (2013.01); *B60T 2220/04* (2013.01); *B60T 2270/60* (2013.01)

(58) Field of Classification Search
CPC .......... B60L 7/26; B60L 7/18; B60L 15/2009; B60L 58/12; B60L 2250/26; B60T 8/3205; B60T 13/586; B60T 2220/04; B60T 2270/60; B60T 1/10; B60T 13/58; B60Y 2200/91; B60Y 2400/81; Y02T 10/64; Y02T 10/7072
USPC ............................................................ 701/22
See application file for complete search history.

(56) References Cited

U.S. PATENT DOCUMENTS

| | | | |
|---|---|---|---|
| 9,660,558 B2 * | 5/2017 | Kim ...................... | B60L 7/22 |
| 10,493,860 B2 * | 12/2019 | Kim ...................... | B60L 3/003 |
| 11,305,773 B1 | 4/2022 | Semenov et al. | |
| 2013/0238208 A1 * | 9/2013 | Hirata .................. | B60L 50/16 701/70 |
| 2016/0031325 A1 * | 2/2016 | Kim ...................... | B60K 6/48 701/70 |
| 2018/0154777 A1 * | 6/2018 | Hall ...................... | B60L 7/18 |

(Continued)

FOREIGN PATENT DOCUMENTS

| | | | |
|---|---|---|---|
| CN | 113365870 A | | 9/2021 |
| JP | 2014-084084 | * | 5/2014 |

(Continued)

*Primary Examiner* — Muhammad Shafi
(74) *Attorney, Agent, or Firm* — Morgan, Lewis & Bockius LLP (57) ABSTRACT

A vehicle may include a hydraulic braking device configured to hydraulically brake at least one of front and rear wheels of the vehicle, a drive motor configured to provide driving force to the at least one of the front wheels and the rear wheels, an accelerator pedal sensor detecting an operation of an accelerator pedal, and a controller electrically connected to the accelerator pedal sensor, wherein the controller is configured to generate a hydraulic braking torque through a cooperative control with the hydraulic braking device depending on an amount of regenerative braking torque while the vehicle coasts.

18 Claims, 8 Drawing Sheets

(56) References Cited

U.S. PATENT DOCUMENTS

| | | |
|---|---|---|
| 2018/0304869 A1 | 10/2018 | Hernandez |
| 2020/0156608 A1* | 5/2020 | Jeon ................ B60W 30/18127 |
| 2020/0254983 A1 | 8/2020 | Suzuki et al. |
| 2021/0122248 A1* | 4/2021 | Seo ........................ B60T 7/042 |
| 2022/0063626 A1 | 3/2022 | Kaneko et al. |
| 2022/0097706 A1 | 3/2022 | Bolger et al. |
| 2022/0105925 A1 | 4/2022 | Naserian et al. |
| 2022/0176827 A1 | 6/2022 | Otanez et al. |

FOREIGN PATENT DOCUMENTS

| | | | |
|---|---|---|---|
| JP | 2020-128106 A | | 8/2020 |
| KR | 20200090402 | * | 7/2020 |

* cited by examiner

VEHICLE AND METHOD OF CONTROLLING THE SAME

CROSS-REFERENCE TO RELATED APPLICATION(S)

The present application claims priority to Korean Patent Application No. 10-2022-0169914, filed on Dec. 7, 2022, the entire contents of which is incorporated herein for all purposes by this reference.

BACKGROUND OF THE PRESENT DISCLOSURE

Field of the Present Disclosure

The present disclosure relates to a vehicle for performing regenerative braking by a driving motor, and a method of controlling the same.

Description of Related Art

Generally, electric vehicles with a drive motor as a power source may operate in a regenerative mode, where a battery is charged by the drive motor acting as a generator.

Electric vehicles perform a regenerative mode in which kinetic energy of a vehicle is converted into electrical energy and recovered when coasting by inertia. In the regenerative mode, a drive motor that receives the kinetic energy of the vehicle through wheels operates as a generator to charge a battery through an inverter.

Furthermore, in an electric vehicle having a drive motor, the drive motor is operated to generate regenerative braking torque (or coast regenerative torque) during coasting. At the instant time, the drive motor operates as a generator, converting the mechanical energy of rotation force transmitted through driving wheels into electrical energy to store in a battery, charging the battery. Simultaneously, a reverse torque is applied to the drive motor in the opposite direction to a driving direction, causing the vehicle to be decelerated.

During regenerative braking, a situation may occur where a fully charged battery limits the regenerative braking. If the regenerative braking is limited, regenerative braking torque may not be generated during coasting, and thus no regenerative braking torque is generated. As a result, a driver may momentarily feel a braking push phenomenon due to the lack of regenerative braking torque.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for improving vehicle stability and deceleration feel of the vehicle by maintaining a constant deceleration of the vehicle through hydraulic cooperative control even when regenerative braking is limited, and a method of controlling the same.

Additional aspects of the present disclosure are set forth in part in the description which follows, and in part, should be understood from the description, or may be learned by practice of the present disclosure.

In accordance with an aspect of the present disclosure, a vehicle includes a hydraulic braking device configured to hydraulically brake at least one of front and rear wheels of the vehicle, a drive motor configured to provide a driving force to the at least one of the front wheels and the rear wheels, an accelerator pedal sensor configured for detecting an operation of an accelerator pedal, and a controller electrically connected to the accelerator pedal sensor, wherein the controller is configured to generate a hydraulic braking torque through a cooperative control with the hydraulic braking device depending on an amount of regenerative braking torque while the vehicle coasts.

The regenerative braking torque during coasting may be generated when a driver of the vehicle releases the accelerator pedal.

A braking torque amount of the regenerative braking torque during coasting may be selected by a driver.

The controller may, in response to a regenerative braking of the drive motor being limited, maintain a total braking torque by generating a hydraulic braking torque corresponding to an insufficient braking torque caused by the regenerative braking torque during limited coasting.

The controller may be configured to determine whether the regenerative braking of the drive motor is limited based on at least one of a state of charge (SOC) value of a battery of the vehicle and an outside temperature of the vehicle.

The controller may be configured to determine that the regenerative braking is limited when the SOC value of the battery is greater than a predetermined limiting charge rate and the outside temperature is lower than a predetermined temperature.

The controller may be configured to determine an insufficient braking torque caused by the regenerative braking torque during limited coasting based on a regenerative braking torque during coasting required at a current vehicle speed and an amount of regenerative braking available generated by the drive motor, determine a compensation amount of regenerative braking during coasting corresponding to the determined insufficient braking torque, determine a compensation amount of hydraulic pressure according to the compensation amount of regenerative braking during coasting, and generate the hydraulic braking torque to generate the compensation amount of hydraulic pressure.

The controller may further accumulate braking energy generated by the hydraulic braking torque and release the hydraulic braking torque based on an accumulated amount of the braking energy.

The controller may further determine the amount of the braking energy based on a hydraulic braking force provided to wheel brakes of the vehicle by the hydraulic braking torque and a moving distance of the vehicle.

The controller may further release the hydraulic braking torque when an SOC value of a battery of the vehicle is lower than a predetermined release charge rate.

The controller may further determine the regenerative braking torque during coasting required at a current vehicle speed according to a map representing that vehicle speed-regenerative braking torque during coasting, and is configured to determine the regenerative braking torque reduced due to the regenerative braking limit according to the determined regenerative braking torque while the vehicle coasts.

In accordance with another aspect of the present disclosure, a method of controlling a vehicle including a hydraulic braking device configured for hydraulically braking at least one of front and rear wheels and a drive motor configured for providing driving force to the at least one of the front and rear wheels is provided. The method includes determining a regenerative braking torque during coasting, and generating a hydraulic braking torque through a cooperative control with the hydraulic braking device depending on an amount of regenerative braking torque while the vehicle coasts.

The generating of the hydraulic braking torque may further include determining whether a regenerative braking of the drive motor is limited, and maintaining, in response to the regenerative braking of the drive motor being limited, total braking torque by generating a hydraulic braking torque corresponding to an insufficient braking torque caused by the regenerative braking torque during limited coasting.

The determining whether the regenerative braking of the drive motor is limited may further include determining whether the regenerative braking of the drive motor is limited based on at least one of a state of charge (SOC) value of a battery of the vehicle and an outside temperature of the vehicle.

The determining whether the regenerative braking of the drive motor is limited may further include determining that the regenerative braking is limited when the SOC value of the battery is greater than a predetermined limiting charge rate and the outside temperature is lower than a predetermined temperature.

The determining of the regenerative braking torque during the coasting may further include determining regenerative braking torque during coasting according to a braking torque amount of the regenerative braking torque during coasting selected by a driver.

The generating of the hydraulic braking torque may further include determining an insufficient braking torque caused by the regenerative braking torque during limited coasting based on a regenerative braking torque during coasting required at a current vehicle speed and an amount of regenerative braking available generated by the drive motor, determining a compensation amount of regenerative braking during coasting corresponding to the determined insufficient braking torque, determining a compensation amount of hydraulic pressure according to the compensation amount of regenerative braking during coasting, and generating the hydraulic braking torque to generate the compensation amount of hydraulic pressure.

The method may further include accumulating braking energy generated by the hydraulic braking torque, and releasing the hydraulic braking torque based on an accumulated amount of the braking energy.

The releasing of the hydraulic braking torque may further include determining the amount of the braking energy based on a hydraulic braking force provided to wheel brakes of the vehicle by the hydraulic braking torque and a moving distance of the vehicle.

The releasing of the hydraulic braking torque may further include releasing the hydraulic braking torque when an SOC value of a battery of the vehicle is lower than a predetermined release charge rate.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference is made below in detail to the exemplary embodiments of the present disclosure, examples of which are illustrated in the accompanying drawings, wherein like reference numerals refer to like elements throughout. This specification does not describe all elements of the disclosed exemplary embodiments and detailed descriptions of what is well known in the art or redundant descriptions on substantially the same configurations have been omitted. The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it includes a clearly different meaning in the context.

The reference numerals used in operations are used for descriptive convenience and are not intended to describe the order of operations and the operations may be performed in a different order unless otherwise stated.

When a component, device, element, or the like of the present disclosure is described as having a purpose or performing an operation, function, or the like, the component, device, or element should be considered herein as being "configured to" meet that purpose or to perform that operation or function.

Hereinafter, various embodiments of the present disclosure are described in detail with reference to the accompanying drawings.

Figure 1:
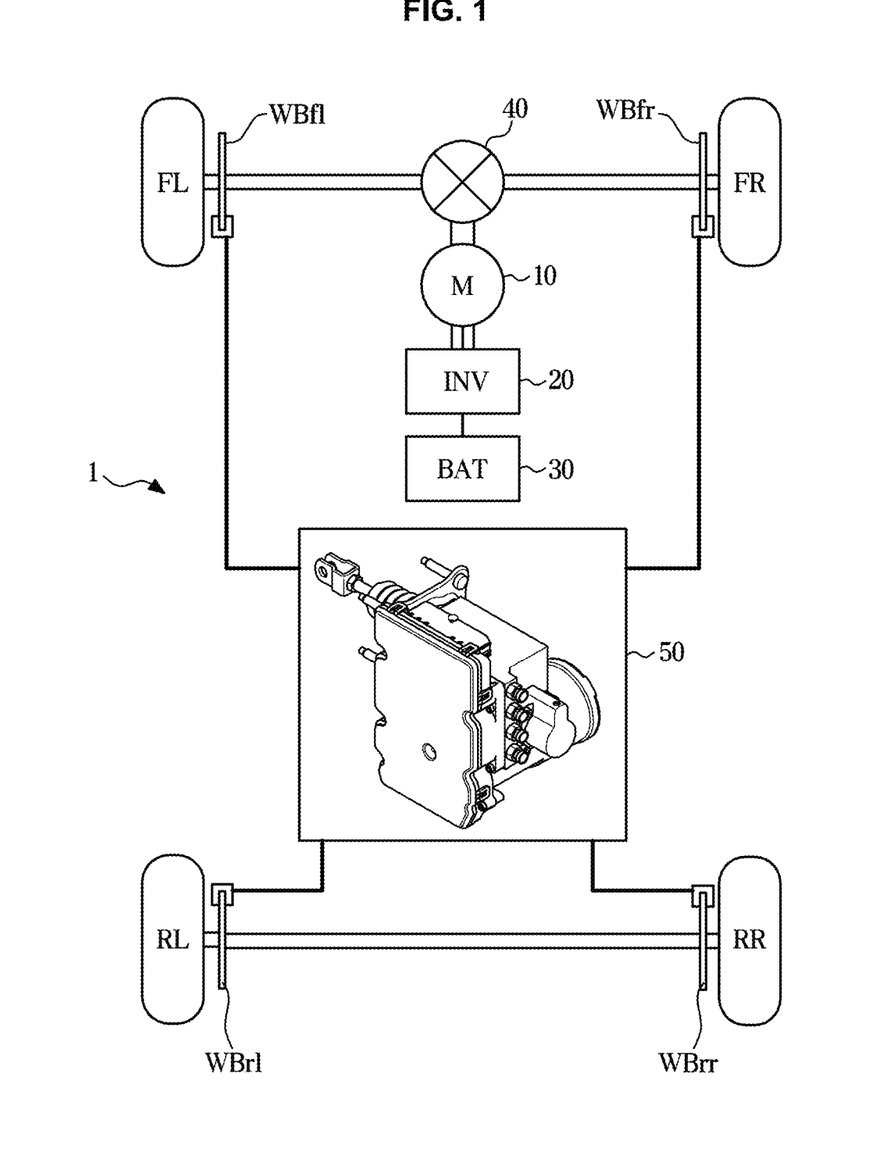
FIG. 1 is a schematic view exemplarily illustrating a configuration of a vehicle according to an exemplary embodiment of the present disclosure.

FIG. 1 is a schematic view exemplarily illustrating a configuration of a vehicle according to an exemplary embodiment of the present disclosure.

Referring to FIG. 1, a vehicle 1 is an electric vehicle including two front wheels (i.e., front left (FL) and front right (FR)) and two rear wheels (i.e., rear left (RL) and rear right (RR)), and the FL and FR wheels may be driving wheels.

The vehicle 1 may drive by rotating the FL and FR wheels, which are the driving wheels, through a drive motor (M) 10, which is a power source.

The drive motor 10 may be driven by an inverter (INV) 20.

A battery (BAT) 30 may be electrically connected to the inverter 20.

The inverter 20 may operate by power supplied from the battery 30 to drive the drive motor 10.

The drive motor 10 may be configured to generate rotational driving force by the inverter 20.

The rotational driving force output from the drive motor 10 may be distributed by a differential device 40 and transmitted to the FL and FR wheels, which are driving wheels. As a result, the FL and FR wheels are rotationally driven, so that the vehicle may travel.

The drive motor 10 may operate as a generator to charge the battery 30 in a regenerative braking mode by braking, deceleration, or low-speed driving.

The drive motor 10, the inverter 20, and the battery 30 may be included in a regenerative braking device that generates regenerative braking force to the FL and FR wheels.

Furthermore, the vehicle 1 may include a hydraulic braking device 50 that generates hydraulic braking force to the front and rear wheels by a brake hydraulic pressure. For example, the hydraulic braking device 50 may be an integrated electric booster.

The hydraulic braking device 50 may provide hydraulic braking force to the respective FL, RR, RL, and FR wheels by supplying hydraulic pressure to wheel brakes (e.g., WBfl, WBrr, WBrl, and WBfr), respectively.

The hydraulic braking device 50 may supply the hydraulic pressure generated by moving a hydraulic piston in a pressure chamber to each of the wheel brakes (e.g., WBfl, WBrr, WBrl, and WBfr) using rotation force of the motor. The hydraulic braking device 50 may be a brake actuator in which a plurality of components are integrated.

Figure 2:
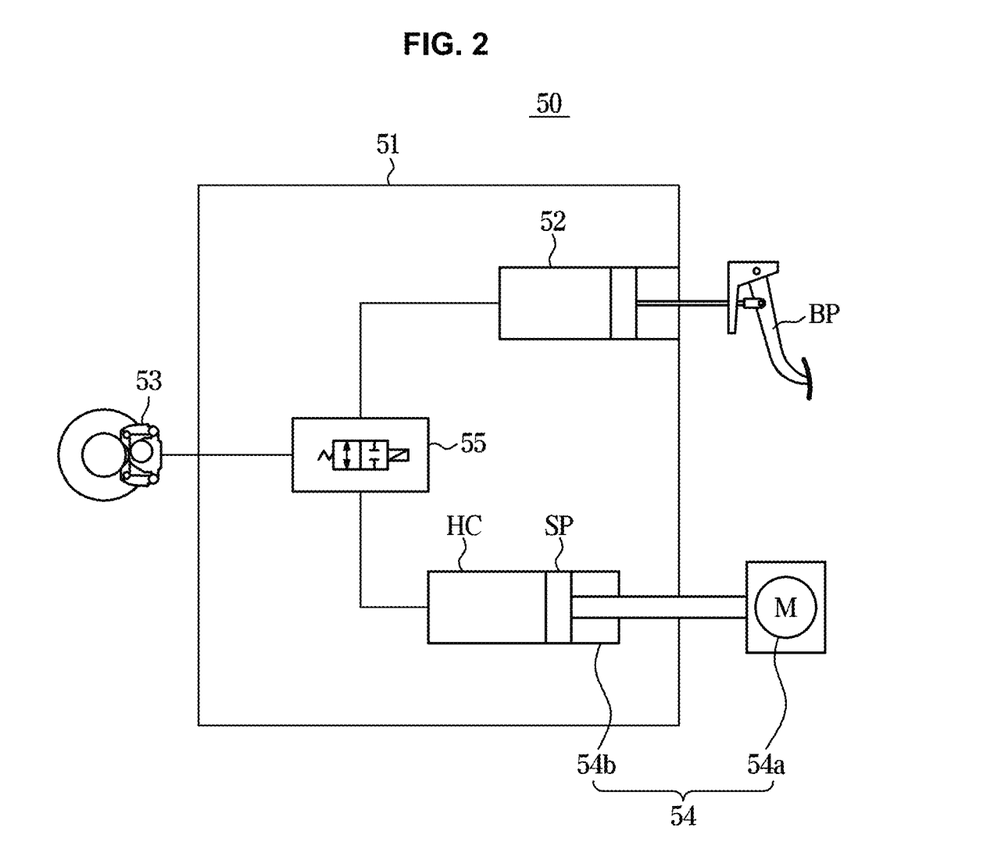
FIG. 2 is a schematic view exemplarily illustrating a configuration of a braking device for a vehicle according to an exemplary embodiment of the present disclosure.

FIG. 2 is a schematic view exemplarily illustrating a configuration of a braking device 50 configured for a vehicle according to an exemplary embodiment of the present disclosure.

Referring to FIG. 2, the hydraulic braking device 50 may be an integrated electronic brake (IEB).

The hydraulic braking device 50 may include a master cylinder 52 which is disposed in a hydraulic block 51 and pressurize and discharge a pressurized medium accommodated therein by manipulation of a brake pedal (BP), the hydraulic block 51 provided with a plurality of flow paths and valves for controlling hydraulic pressure therein, wheel brakes (e.g., WBfl, WBrr, WBrl, WBfr) 53 coupled to the hydraulic block 51 and provided on each wheel, a hydraulic pressure supply device 54 that generates hydraulic pressure by being driven by an electrical signal corresponding to a displacement of the brake pedal (BP) and supplies the generated hydraulic pressure to each wheel brake 53 provided on each wheel, and a hydraulic control unit 55 controlling a flow of the hydraulic pressure transmitted to each wheel brake 53 by the hydraulic pressure supply device 54.

The hydraulic pressure supply device 54 may include a motor 54a coupled to the side of the hydraulic block 51, and a slave cylinder 54b pressed by a power transmission coupled with the motor 54a to convert rotation force into linear motion. The slave cylinder 54b may include a slave piston (SP) which is separately provided in the hydraulic block 51 from the master cylinder 52 and reciprocates by rotation force of the motor 54a to generate hydraulic pressure, and a hydraulic chamber (HC) pressurized by the slave piston (SP). At the instant time, a rack gear may be formed on a portion of the slave piston (SP) so that the slave piston (SP) linearly moves through the power transmission.

The hydraulic pressure supply device 54 may be of various types and structures.

The hydraulic control unit 55 may receive hydraulic pressure from the master cylinder 52 or the hydraulic pressure supply device 54 to control the hydraulic pressure transmitted to the wheel brakes 53.

The hydraulic control unit 55 may include one or more solenoid valves that are electronically opened and closed.

The hydraulic braking device 50 including the above components does not allow the hydraulic pressure discharged from the master cylinder 52 to be transmitted to the wheel brakes 53 by closing cut valves disposed in the flow paths between the master cylinder 52 and the wheel brakes 53 during hydraulic braking.

Furthermore, the hydraulic braking device 50 may be configured to generate hydraulic pressure by operating the hydraulic pressure supply device 54. For example, the hydraulic braking device 50 may be configured to generate the hydraulic pressure in a hydraulic pressure chamber HC by moving the SP by the motor 54a of the hydraulic pressure supply device 54. The hydraulic pressure generated by the hydraulic pressure supply device 54 is supplied to the wheel brakes 53 through the hydraulic control unit 55 to generate braking force on the wheels. At the instant time, the hydraulic braking device 50 may increase, decrease, or maintain the pressure of the wheel brakes 53 of the wheels by driving the hydraulic pressure supply device 54 and the hydraulic control unit 55 according to a required hydraulic braking amount.

Figure 3:
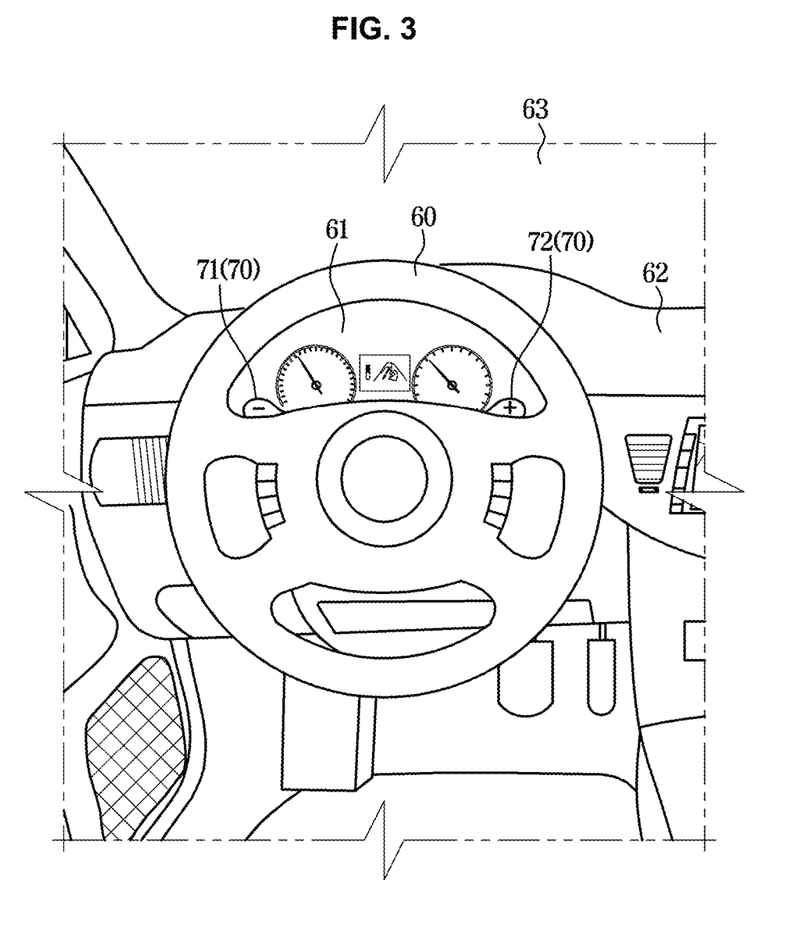
FIG. 3 is a view exemplarily illustrating a paddle shift of a vehicle according to an exemplary embodiment of the present disclosure.

FIG. 3 is a view exemplarily illustrating a paddle shift of a vehicle according to an exemplary embodiment of the present disclosure.

Referring to FIG. 3, the vehicle 1 may include, around a seat on which a driver sits, a steering wheel 60, a cluster 61 provided on a front of a vehicle body from the steering wheel 60 and displaying operation information of the vehicle 1, and a dashboard 62 connected to the cluster 61 and provided with various devices for manipulating the vehicle 1.

In detail, the dashboard 62 is provided to protrude from a lower portion of a windshield 63 toward the seats, and allows a driver to manipulate various devices provided on the dashboard 62 while looking forward.

For example, various devices provided on the dashboard 62 may include an Audio/Video/Navigation (AVN) device or an air vent connected to an air conditioner and various input/output devices on a center fascia of the dashboard 62.

The cluster 61 may display a current state and operation information for controlling the vehicle 1, and for the present purpose include various display devices.

The steering wheel 60 may include a plurality of buttons through which the driver may easily transmit different input commands while driving.

A paddle shift 70 may be provided on the steering wheel 60 toward the cluster 61.

The paddle shift 70 may receive an input command related to a regenerative braking level from the driver. The paddle shift 70 may select step by step the regenerative braking level that allows control of an amount of regenerative braking torque during coasting.

The paddle shift 70 may include a first paddle shift 71 for downshifting to decrease the regenerative braking level and a second pad shift 72 for upshifting to increase the regenerative braking level.

The paddle shift 70 may be a device for receiving a command for adjusting a braking torque amount of the regenerative braking torque during coasting.

Accordingly, the driver may adjust the regenerative braking level by manipulating the paddle shift 70, adjusting the amount of regenerative braking torque during coasting.

Figure 4:
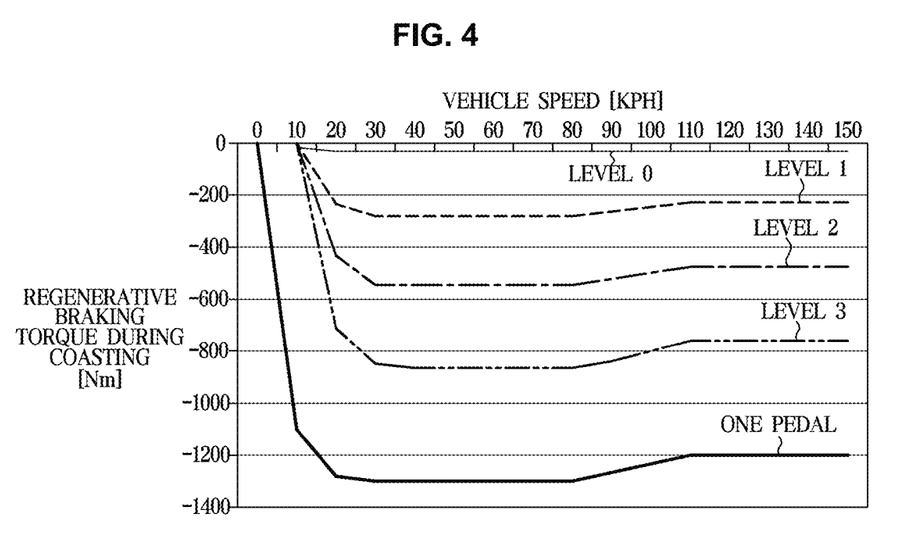
FIG. 4 is a graph illustrating regenerative braking torque during coasting at each vehicle speed according to a paddle shift operation of the vehicle according to an exemplary embodiment of the present disclosure.

FIG. 4 is a graph illustrating regenerative braking torque during coasting at each vehicle speed according to a paddle shift operation of the vehicle according to an exemplary embodiment of the present disclosure.

Referring to FIG. 4, the horizontal axis represents vehicle speed, and the vertical axis represents regenerative braking torque during coasting.

When the vehicle 1 coasts in a deceleration direction at or above a predetermined vehicle speed based on a level set by the paddle shift 70, the regenerative braking torque may be generated at four different levels: Level 0, Level 1, Level 2, Level 3, and Level 4 (one pedal), and each level may include a predetermined torque value for each vehicle speed.

In detail, at the vehicle speed of 10 km/h or less, Level 0 is a level at which a load applied to the vehicle 1 is removed by maintaining the regenerative braking torque at 0 Nm during coasting.

The more the driver increases the level using the second paddle shift 72, the more the regenerative braking torque generated by the drive motor 10 during coasting increases. As the level increases, a greater regenerative braking force may be applied to the vehicle 1.

If the regenerative braking torque is excessively large during coasting, a problem may occur in driving stability. Therefore, the vehicle 1 may limit the maximum amount of regenerative braking torque generated during coasting at each level.

During coasting, each level of regenerative braking torque may vary, and also the limited maximum torque value is not limited to the graph of FIG. 4.

On the other hand, when the driver releases an accelerator pedal, the drive motor 10 generates the regenerative braking torque during coasting based on the level set by the paddle shift 70. Accordingly, the vehicle may perform regenerative braking during coasting, which may stop the vehicle without the brake pedal being operated by the driver.

Conventionally, the battery 30 that has been fully charged from coasting may limit the regenerative braking.

If a situation occurs in which the regenerative braking is limited, the drive motor 10 may not generate the regenerative braking torque during coasting, so that the deceleration set in the vehicle does not occur and the driver may therefore feel the braking jerk (e.g., brake slip) momentarily.

When the battery 3, which is a limiting condition for regenerative braking, is fully charged, and thus the regenerative braking torque may not be utilized during coasting, the vehicle 1 according to an exemplary embodiment is configured to perform cooperative control with the hydraulic braking device 50 to compensate for the lack of the hydraulic braking torque during coasting. As a result, it is possible to allow the driver to feel the same deceleration feel as when the regenerative braking torque during coasting is used. In other words, the vehicle 1 according to various exemplary embodiments of the present disclosure may compensate for an insufficient amount of regenerative braking torque during coasting when a conventionally set regenerative braking torque during coasting is not available.

Figure 5:
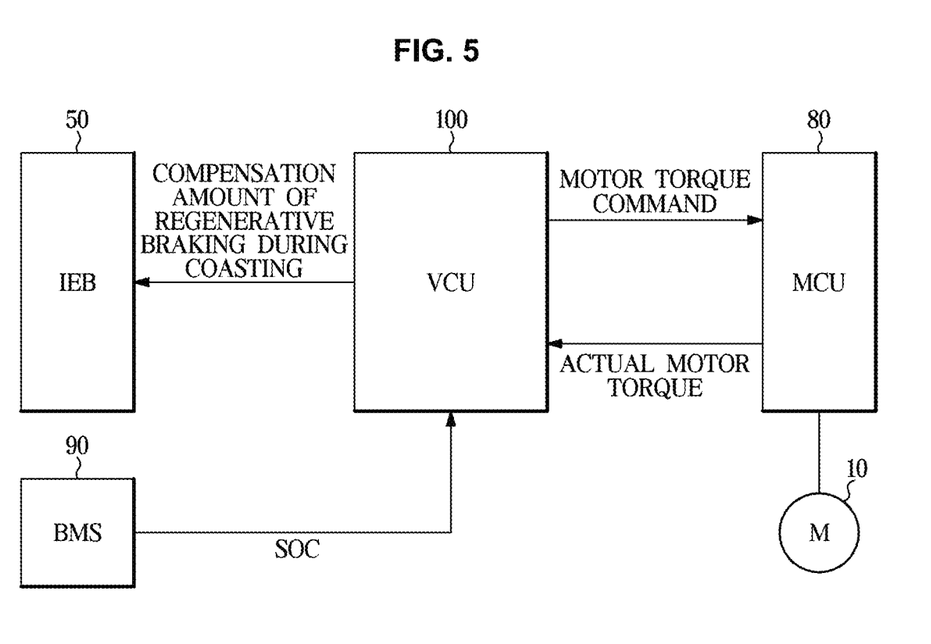
FIG. 5 is a control block diagram showing a vehicle according to an exemplary embodiment of the present disclosure.

FIG. 5 is a control block diagram showing a vehicle according to an exemplary embodiment of the present disclosure.

Referring to FIG. 5, the vehicle 1 may include a motor control unit (MCU) 80, a battery management system (BMS) 90, and a vehicle control unit (VCU) 100.

The MCU 80 may be configured for controlling driving and regeneration of the drive motor 10 using the inverter 20 according to a control command of the VCU 100.

The BMS 90 may monitor a state of charge (SOC) value of the battery 30 and transmit the monitored SOC information to the VCU 100.

The VCU 100 is a controller that is configured to control the overall vehicle and may be a top-level controller.

The VCU 100 may perform a cooperative control by exchanging information with the hydraulic braking device (e.g., integrated electronic brake (IEB)) 50 and the MCU 80 via a vehicle network.

The VCU 100 may exchange information with the BMS 90 via a vehicle network.

The VCU 100 may transmit a hydraulic braking command for generating hydraulic braking force to the hydraulic braking device 50, and may transmit a regenerative braking command for generating regenerative braking force to the MCU 80.

The VCU 100 may communicate with different devices using an in-vehicle network, such as various communication technologies, for example, Ethernet, Media Oriented Systems Transport (MOST), Flexray, Local Interconnect Network (LIN), or the like, in addition to a Controller Area Network (CAN) communication.

When the driver releases the accelerator pedal, the VCU 100 generates a motor torque command based on the SOC information of the battery 30 and a request of the driver (e.g., regenerative braking level according to manipulation of the paddle shift 70), and transmits the motor torque command to the MCU 80.

The MCU 80 generates a motor driving signal for driving the drive motor 10 through the inverter 20 to implement the motor torque command output by the VCU 100, and outputs the motor driving signal to the drive motor 10 to drive the drive motor 10. Consequently, the regenerative braking is performed by the drive motor 10 to generate the regenerative braking torque during coasting depending on the vehicle speed. At the instant time, because the drive motor 10 operates as a generator, the battery 30 is charged by converting the mechanical rotational energy of the driving wheels into electrical energy and storing in the battery 30. At the same time, the reverse torque is applied to the drive motor in the opposite direction to the driving direction, causing the vehicle to be decelerated.

The MCU 80 may transmit actual motor torque information of the drive motor 10 to the VCU 100.

The VCU 100 may be configured to determine the regenerative braking torque during actual coasting from the actual motor torque provided by the MCU 80, and determine an execution amount of regenerative braking based on the regenerative braking torque during actual coasting. The VCU 100 may be configured to determine a control amount corresponding to the regenerative braking torque during actual coasting as the execution amount the regenerative braking.

On the other hand, when the battery 30, which is the limiting condition for regenerative braking, is in an almost fully charged state, the set deceleration does not occur because the regenerative braking torque during coasting may not be utilized.

The VCU 100 may compensate for the lack of regenerative braking torque during coasting with the hydraulic braking torque by cooperative control with the hydraulic braking device 50.

The VCU 100 may transmit, to the hydraulic braking device 50, information on a compensation amount of regenerative braking during coasting corresponding to the insufficient amount of regenerative braking torque during coasting.

The hydraulic braking device 50 is configured to perform hydraulic braking and generates a compensation amount of hydraulic pressure according to the compensation amount of regenerative braking during coasting. The hydraulic braking device 50 drives the hydraulic pressure supply device 54 and the hydraulic control unit 55 based on the compensation amount of hydraulic pressure to supply the hydraulic pressure to each wheel brake (i.e., WBfl, WBrr, WBrl, and WBfr), providing hydraulic braking force to each wheel (i.e., FL, FR, RL, and RR).

Therefore, although when the regenerative braking torque during coasting may not be utilized by use of hydraulic cooperative control, the driver may feel the same deceleration feel as when the regenerative braking torque during coasting is used.

Figure 6:
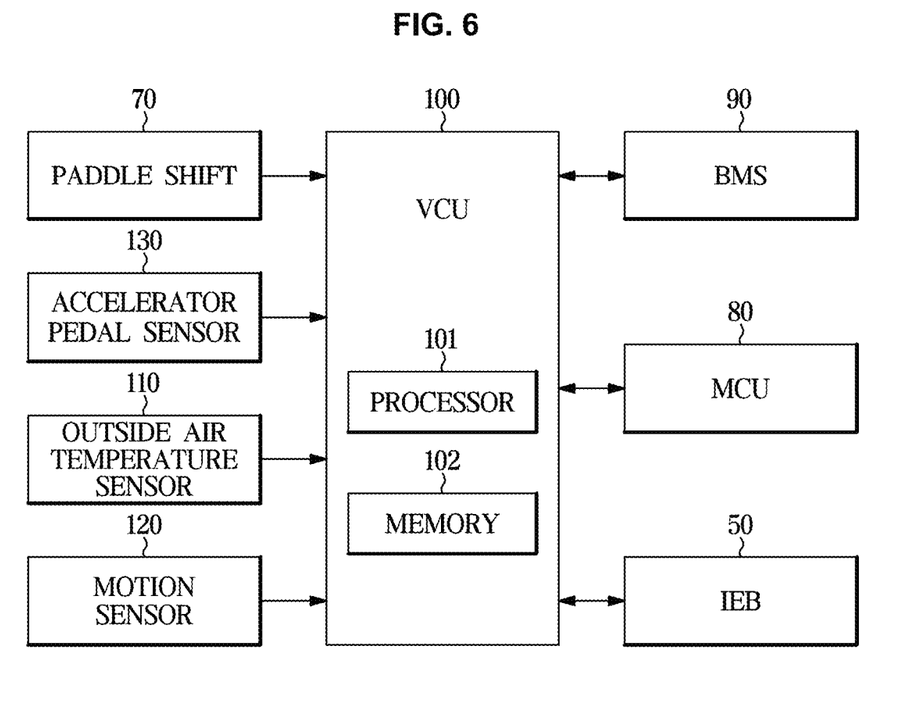
FIG. 6 is a control block diagram showing a vehicle control unit of a vehicle according to an exemplary embodiment of the present disclosure.

FIG. 6 is a control block diagram showing the VCU of a vehicle according to an exemplary embodiment of the present disclosure.

Referring to FIG. 6, the VCU 100 may be electrically connected to the paddle shift 70, an accelerator pedal sensor 130, an outside air temperature sensor 110, and a motion sensor 120.

The paddle shift 70 may receive a paddle shift signal associated with the level of braking regeneration selected by the driver.

The accelerator pedal sensor 130 may detect an operation of the accelerator pedal of the vehicle 1.

The outside air temperature sensor 110 may detect the outside air temperature of the vehicle 1.

The motion sensor 120 may detect motion data representing a movement of the vehicle 1. For example, the motion sensor 120 may include a speed sensor configured for detecting the speed of the vehicle 1, an acceleration sensor configured for detecting a lateral acceleration and/or longitudinal acceleration of the vehicle 1, and a yaw rate sensor configured for detecting a yaw rate of the vehicle 1, a steering angle sensor configured for detecting a steering angle of the steering wheel, a torque sensor configured for detecting a steering torque of the steering wheel, and the like. The motion sensor 120 may transmit motion data to the VCU 100. The VCU 100 may receive motion data of the motion sensor 120 via a vehicle network.

The VCU 100 may include at least one processor 101 and a memory 102.

The memory 102 may store programs and data associated with compensation of regenerative braking torque during coasting.

The memory 102 may be implemented as at least one of a nonvolatile memory device such as a cache, a read only memory (ROM), a programmable ROM (PROM), an erasable programmable ROM (EPROM), an electrically erasable programmable ROM (EEPROM), and flash memory, or a volatile memory device such as a random access memory (RAM), or a storage medium such as a Hard Disk Drive (HDD), a compact disk (CD-ROM), but is not limited thereto.

The memory 102 may be a memory implemented as a separate chip from the processor described above with respect to the processor 101, or may be implemented as a single chip with the processor 101.

The VCU 100 may be configured to determine whether the accelerator pedal is partially or fully released from the depressed condition based on an operating state of the accelerator pedal detected by the accelerator pedal sensor 130 while the vehicle is travelling, and when the depression of the accelerator pedal is released, the VCU 100 may be configured to determine that the driver has released the accelerator pedal.

The VCU 100 may be configured to determine whether the regenerative braking limit condition is satisfied, where the regenerative braking torque during coasting is unavailable.

When the battery 30 is fully charged, it may be determined that the regenerative braking limit condition is satisfied.

The VCU 100 is configured to determine a chargeable amount based on SOC information related to battery charging, such as the temperature and state of charge of the battery 30 provided by the BMS 90, and is configured to determine whether the battery 30 is fully charged based on the chargeable amount.

The VCU 100 may be configured to determine that the regenerative braking limit condition is satisfied when the outside air temperature detected by the outside air temperature sensor 110 is lower than a predetermined temperature.

The VCU 100 may be configured to determine that the regenerative braking limit condition is satisfied when the SOC value of the battery 30 is greater than a predetermined limiting charge rate and the outside temperature is lower than the predetermined temperature.

The VCU 100 may be configured to determine the insufficient amount of regenerative braking torque during coasting if the regenerative braking limit condition is satisfied in a state where the driver has released the accelerator pedal.

The VCU 100 may be configured to determine the regenerative braking torque during coasting required at the current vehicle speed by use of the regenerative braking torque map during vehicle speed-coasting, and based on the regenerative braking torque during coasting required for the current vehicle speed, determine the insufficient amount of regenerative braking torque during coasting.

The VCU 100 may transmit, to the hydraulic braking device 50, the information on the compensation amount of regenerative braking during coasting corresponding to the insufficient amount of regenerative braking torque during coasting. In other words, when performing regenerative braking, the VCU 100 may convert the insufficient amount of regenerative braking torque during coasting into hydraulic braking torque. Accordingly, the hydraulic braking device 50 may be configured to generate the compensation amount of hydraulic pressure according to the compensation amount of regenerative braking during coasting by performing the hydraulic braking. As a result, even when the regenerative braking torque during coasting is not available due to the regenerative braking limit conditions, the driver may feel the same sense of deceleration as when the regenerative braking torque is used during coasting.

On the other hand, when hydraulic braking of the vehicle 1 is continuously used, a brake fade phenomenon may occur. The brake fade phenomenon refers to a phenomenon in which, when hydraulic braking is continuously used on a downhill road, the braking force may be reduced or the braking force may be lost as the temperature rises rapidly due to friction between the brake disc and the brake pad for a long time.

Therefore, to secure braking reliability of the hydraulic braking device 50, the VCU 100 may release the hydraulic pressure compensation control at an appropriate time in consideration of heat load of the wheel brakes and perform regenerative braking again.

The VCU 100 may be configured to determine a hydraulic braking torque release time based on braking energy generated by hydraulic pressure compensation braking, and release the hydraulic braking torque at the hydraulic braking torque release time.

The VCU 100 may accumulate the braking energy generated by the hydraulic braking torque, and determine a braking switching time in response to the accumulated amount of braking energy being greater than a predetermined amount of energy.

The amount of the braking energy generated by the hydraulic braking torque may be obtained from the hydraulic braking force and a moving distance. Assuming that the vehicle 1 decelerates from Vk1 to Vk2, the braking energy generated by the hydraulic braking torque may be obtained based on Vk1 and Vk2.

For example, the braking energy (E) per sample generated by the hydraulic braking torque may be determined using Equation 1.

$$E = (P \times TP/\text{Reff}) \times L \, [kJ] \quad \text{Equation 1}$$

Here, P is a wheel pressure, TP is a torque factor, Reff is an effective radius of a tire, and L is a moving distance of the sample. L may be obtained from a previous sample vehicle speed Vk1, a current vehicle speed Vk2, and a sampling time. The sampling time is a time from Vk1 to reach Vk2.

Figure 7:
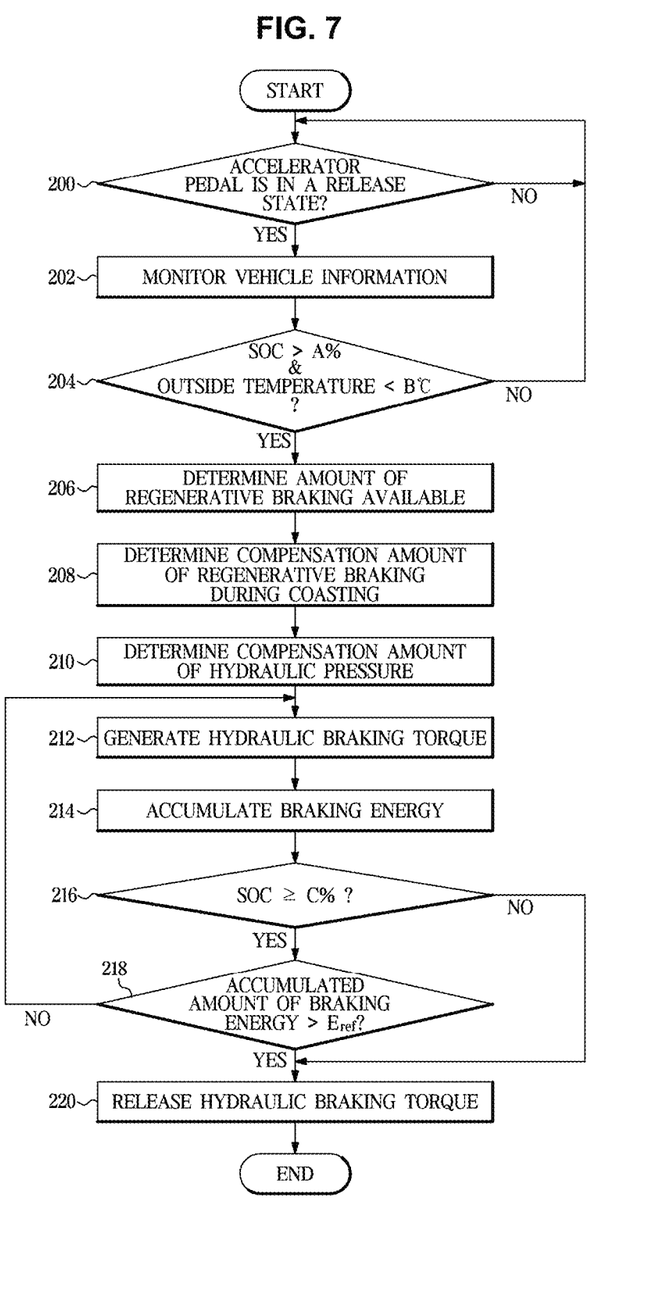
FIG. 7 is a flowchart showing a method for controlling a vehicle according to an exemplary embodiment of the present disclosure.

FIG. 7 is a flowchart showing a method for controlling a vehicle according to an exemplary embodiment of the present disclosure.

The vehicle 1 may be configured to determine whether the accelerator pedal is switched to a release state (200).

The VCU 100 may be configured to determine that the accelerator pedal has been released when the accelerator pedal sensor 130 detects that some or all of the pressing on the accelerator pedal is released.

In response to the accelerator pedal being released, the vehicle 1 may monitor vehicle information including the SOC value of the battery 20 and the outside temperature of the vehicle 1 (202). At the instant time, in response to the accelerator pedal being released, the vehicle 1 may monitor vehicle information including the temperature state and SOC value of the battery 20 and the outside temperature of the vehicle 1. Furthermore, in response to the accelerator pedal being released, the vehicle 1 may monitor vehicle information including the temperature state and SOC value of the battery 20, the outside temperature of the vehicle 1, and the vehicle speed.

The vehicle 1 may be configured to determine whether the regenerative braking limit condition is satisfied based on the SOC value of the battery 30 and the outside temperature to determine whether the regenerative braking torque during coasting cannot be utilized. To determine whether the regenerative braking limit condition is satisfied, the vehicle 1 may be configured to determine whether the SOC exceeds the predetermined limiting charge rate of A % (e.g., 95%) and the outside air temperature is less than the predetermined temperature of B ° C. (e.g., −10° C.)(204).

If the SOC exceeds A % and the outside air temperature is less than B ° C. (Yes in 204), the VCU 100 may be configured to determine that the regenerative braking limit condition is satisfied. In the instant case, A %, charging rate when the battery 30 is fully charged, may vary depending on the temperature and specifications of the battery 30. In general, the battery is charged only to 90 to 95% in terms of protection. B ° C., a limit temperature at which the charging rate of the battery 30 affects, and may vary depending on vehicle or battery specifications.

In other words, when the battery 30 is fully charged, the VCU 100 may be configured to determine that the regenerative braking limit condition is satisfied.

Furthermore, the VCU 100 may be configured to determine that the regenerative braking limit condition is not satisfied if the SOC does not exceed A % or the outside air temperature is not less than B ° C. (No in 204).

In response to the regenerative braking limit condition being satisfied, the vehicle 1 may be configured to determine an amount of regenerative braking available (206).

The VCU 100 may be configured to determine the chargeable amount of the battery 30 based on SOC information related to battery charging, such as the temperature and SOC value of the battery 30 provided by the BMS 90, and determine the amount of regenerative braking available depending on the chargeable amount of the battery 30.

The vehicle 1 may be configured to determine the compensation amount of regenerative braking during coasting according to the amount of regenerative braking available (208).

The VCU 100 may be configured to determine the regenerative braking torque during coasting required at the current vehicle speed according to the map representing that the vehicle speed during coasting—the regenerative braking torque during coasting, and determine the compensation amount of regenerative braking during coasting corresponding to the insufficient amount of the regenerative braking torque during coasting required for the amount of regenerative braking available.

The vehicle 1 may be configured to determine the compensation amount of hydraulic pressure according to the compensation amount of regenerative braking during coasting (210).

The hydraulic braking system 50 may be configured to determine the compensation amount of hydraulic pressure according to the compensation amount of regenerative braking during coasting provided by the VCU 100. The hydraulic braking device 50 may be configured to determine the control amount corresponding to the compensation amount of regenerative braking as the compensation amount of hydraulic pressure during coasting.

The vehicle 1 may be configured to generate the hydraulic braking torque according to the compensation amount of hydraulic pressure (212).

The hydraulic braking device 50 drives the hydraulic pressure supply device 54 and the hydraulic control unit 55 based on the compensation amount of hydraulic pressure to supply the hydraulic pressure to each wheel brake (i.e., WBfl, WBrr, WBrl, and WBfr), providing hydraulic braking force to each wheel (i.e., FL, FR, RL, and RR).

After generating the hydraulic braking torque, the vehicle 1 may accumulate the braking energy generated by the hydraulic braking torque (214).

The vehicle 1 may be configured to determine whether the SOC is greater than or equal to C % (e.g., 80%), which is a predetermined release charge rate (216). While generating the hydraulic braking torque, the battery 30 consumes a charged power as vehicle travels. C % is a charge rate capable of releasing the regenerative braking limit condition and may vary depending on the temperature and specifications of the battery 30.

When the SOC value of the vehicle 1 is greater than or equal to C % (Yes in 216), the vehicle 1 may be configured to determine whether the accumulated amount of braking energy exceeds a predetermined amount of energy $E_{ref}$ (218).

If the accumulated amount of braking energy is less than or equal to the $E_{ref}$, the vehicle 1 moves to operation 212 and continues to perform the following operations.

Meanwhile, when the accumulated amount of braking energy exceeds the $E_{ref}$, the vehicle 1 may release the hydraulic braking torque (220).

As continuous generation of hydraulic braking torque may cause a brake fade phenomenon in the vehicle 1, the VCU 100 may release the generation of hydraulic braking torque to ensure braking reliability of the hydraulic braking device 50. For example, when a vehicle is travelling downhill in an alpine area for a long time, the brake fade phenomenon may occur due to the generation of hydraulic braking torque. Accordingly, when the SOC value of the battery 30 satisfies a charge rate sufficient to utilize the regenerative braking torque during coasting, the hydraulic braking torque may be released.

The VCU 100 may be configured to generate the regenerative braking torque during coasting based on the current vehicle speed according to the map representing that the vehicle speed during coasting—the regenerative braking torque during coasting. To the present end, the VCU 100 causes the MCU 80 to drive the drive motor 10 as a generator, charging the battery 30 and simultaneously generating the regenerative braking torque when the drive motor 10 coasts in a direction opposite to the driving direction, so that the vehicle 1 in coasting may be maintained at a set deceleration.

Meanwhile, when the SOC value of the vehicle 1 is less than C % (No in 216), the vehicle 1 may release the hydraulic braking torque (220).

Figure 8:
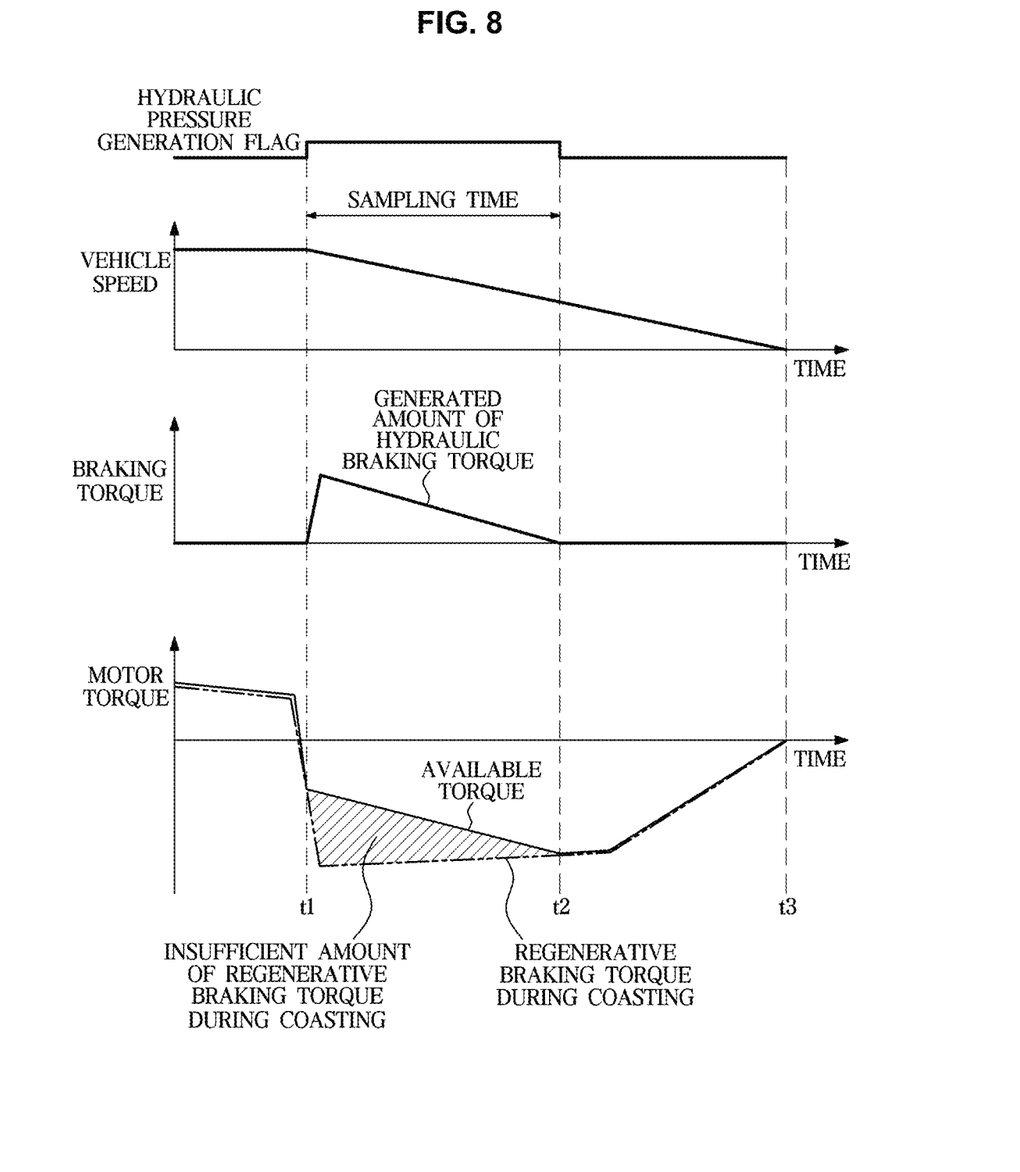
FIG. 8 is a graph showing that the hydraulic braking torque is generated as much as an insufficient amount of regenerative braking torque during coasting in a vehicle according to an exemplary embodiment of the present disclosure.

FIG. 8 is a graph showing that the hydraulic braking torque is generated as much as an insufficient amount of regenerative braking torque during coasting in a vehicle according to an exemplary embodiment of the present disclosure.

Referring to FIG. 8, when the driver releases the accelerator pedal having been depressed at a time (t1) while the vehicle 1 is travelling, the vehicle 1 may monitor the SOC value of the battery 20 and the outside temperature of the vehicle 1, and determine, based on the SOC and/or the outside air temperature, as a situation where the regenerative braking torque cannot be utilized during coasting.

When the vehicle 1 is in a situation where the regenerative braking limit condition is satisfied, the vehicle 1 may be configured to determine the compensation amount of regenerative braking during coasting, which is the insufficient amount of regenerative braking torque during coasting requested at the current vehicle speed among the amount of regenerative braking available generated by regenerative braking of the drive motor 10, determine the compensation amount of hydraulic pressure according to the compensation amount of regenerative braking during coasting, and generate the hydraulic braking torque through the hydraulic braking device 50 according to the compensation amount of hydraulic pressure (t1-t2). A hydraulic pressure generation flag for generating the hydraulic braking torque may be configured to generate the hydraulic braking torque during a sampling time (t1-t2).

If, during the generation of the hydraulic braking torque, the SOC becomes lower than the predetermined release charge rate to release the regenerative braking limit, the vehicle 1 may release the hydraulic braking torque (t2-t3).

Meanwhile, if the accumulated braking energy generated by the hydraulic braking torque exceeds the amount of energy which may prevent a brake fade phenomenon even when the SOC is not lowered below the predetermined release charge rate so that the regenerative braking limit may be released during the generation of the hydraulic braking torque, the vehicle 1 may release the hydraulic braking torque to ensure braking reliability of the hydraulic braking device 50 (T2-t3).

As described above, the vehicle according to various embodiments of the present disclosure may be configured to generate the hydraulic braking torque as much as the insufficient amount of regenerative braking torque during coasting through the hydraulic cooperative control even when the regenerative braking is limited, so that vehicle stability is improved and the driver has the same deceleration feel as when using the regenerative braking torque during coasting.

Meanwhile, the aforementioned control unit and/or its components may include one or more processor/microprocessor(s) combined with a computer readable recording medium storing computer readable code/algorithm/software. The processor/microprocessor(s) may execute the computer readable code/algorithm/software stored in a computer readable recording medium to perform the aforementioned functions, operations, steps, and the like.

The above-described control unit and/or its components may further include a memory implemented as a computer-readable non-transitory recording medium or a computer-readable temporary recording medium. The memory may be controlled by the above-described control unit and/or its components, configured to store data transmitted to or received from the above-described control unit and/or its components, or by the above-described control unit and/or its components. It may be processed or configured to store data to be processed.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
   a hydraulic braking device configured to hydraulically brake at least one of front and rear wheels of the vehicle;
   a drive motor configured to provide a driving force to the at least one of the front wheels and the rear wheels;
   an accelerator pedal sensor configured for detecting an operation of an accelerator pedal; and
   a controller electrically connected to the accelerator pedal sensor;
   wherein the controller is configured to generate a hydraulic braking torque through a cooperative control with the hydraulic braking device depending on an amount of regenerative braking torque while the vehicle coasts, and
   wherein the controller is further configured to determine an amount of braking energy based on a hydraulic braking force provided to wheel brakes of the vehicle by the hydraulic braking torque and a moving distance of the vehicle, and release the hydraulic braking torque based on the determined amount of the braking energy.

2. The vehicle of claim 1, wherein the regenerative braking torque during the coasting is generated when a driver of the vehicle releases the accelerator pedal.

3. The vehicle of claim 1, wherein a braking torque amount of the regenerative braking torque during the coasting is determined in response to a driver's selection.

4. The vehicle of claim 1, wherein the controller is further configured to, in response to a regenerative braking of the drive motor being limited, maintain a total braking torque by generating the hydraulic braking torque corresponding to an insufficient braking torque caused by the regenerative braking torque during limited coasting.

5. The vehicle of claim 4, wherein the controller is further configured to determine whether the regenerative braking of the drive motor is limited based on at least one of a state of charge (SOC) value of a battery of the vehicle and an outside temperature of the vehicle.

6. The vehicle of claim 5, wherein the controller is further configured to determine that the regenerative braking is limited when the SOC value of the battery is greater than a predetermined limiting charge rate and the outside temperature is lower than a predetermined temperature.

7. The vehicle of claim 4, wherein the controller is further configured to:
determine the regenerative braking torque during the coasting required at a current vehicle speed according to a map representing a relationship between a vehicle speed and the regenerative braking torque during the coasting, and to determine the regenerative braking torque reduced due to a regenerative braking limit according to the determined regenerative braking torque during the coasting.

8. The vehicle of claim 1, wherein the controller is further configured to:
determine an insufficient braking torque caused by the regenerative braking torque during limited coasting based on a regenerative braking torque during the coasting required at a current vehicle speed and an amount of regenerative braking available generated by the drive motor,
determine a compensation amount of the regenerative braking during the coasting corresponding to the determined insufficient braking torque,
determine a compensation amount of hydraulic pressure according to the compensation amount of the regenerative braking during the coasting, and
generate the hydraulic braking torque to generate the compensation amount of the hydraulic pressure.

9. The vehicle of claim 1, wherein the controller is further configured to accumulate the determined amount of the braking energy, and wherein the release of the hydraulic braking torque is further based on the accumulated amount of the braking energy.

10. The vehicle of claim 1, wherein the controller is further configured to release the hydraulic braking torque when an SOC value of a battery of the vehicle is lower than a predetermined release charge rate.

11. A method of controlling a vehicle including a hydraulic braking device for hydraulically braking at least one of front and rear wheels and a drive motor for providing driving force to the at least one of the front and rear wheels, the method comprising:
determining, by a controller, a regenerative braking torque while the vehicle coasts;
generating, by the controller, a hydraulic braking torque through a cooperative control with the hydraulic braking device depending on an amount of regenerative braking torque during the coasting; and
determining, by the controller, an amount of braking energy based on a hydraulic braking force provided to wheel brakes of the vehicle by the hydraulic braking torque and a moving distance of the vehicle; and
releasing the hydraulic braking torque based on the determined amount of the braking energy.

12. The method of claim 11, wherein the generating of the hydraulic braking torque further includes:
determining whether a regenerative braking of the drive motor is limited, and
maintaining, in response to the regenerative braking of the drive motor being limited, a total braking torque by generating a hydraulic braking torque corresponding to an insufficient braking torque caused by the regenerative braking torque during limited coasting.

13. The method of claim 12, wherein the determining whether the regenerative braking of the drive motor is limited further includes determining whether the regenerative braking of the drive motor is limited based on at least one of a state of charge (SOC) value of a battery of the vehicle and an outside temperature of the vehicle.

14. The method of claim 13, wherein the determining whether the regenerative braking of the drive motor is limited further includes determining that the regenerative braking is limited when the SOC value of the battery is greater than a predetermined limiting charge rate and the outside temperature is lower than a predetermined temperature.

15. The method of claim 11, wherein the determining of the regenerative braking torque during the coasting further includes determining the regenerative braking torque during the coasting according to a braking torque amount of the regenerative braking torque which is determined in response to a driver's selection.

16. The method of claim 11, wherein the generating of the hydraulic braking torque further includes:
determining an insufficient braking torque caused by the regenerative braking torque during limited coasting based on a regenerative braking torque during the coasting required at a current vehicle speed and an amount of regenerative braking available generated by the drive motor,
determining a compensation amount of regenerative braking during the coasting corresponding to the determined insufficient braking torque,
determining a compensation amount of hydraulic pressure according to the compensation amount of the regenerative braking during the coasting, and
generating the hydraulic braking torque to generate the compensation amount of the hydraulic pressure.

17. The method of claim 11, further including:
accumulating the determined amount of the braking energy,
wherein the releasing the hydraulic braking torque is further based on the accumulated amount of the braking energy.

18. The method of claim 11, wherein the releasing of the hydraulic braking torque further includes releasing the hydraulic braking torque when an SOC value of a battery of the vehicle is lower than a predetermined release charge rate.

* * * * *